United States Patent
Sittig et al.

(10) Patent No.: US 9,421,488 B2
(45) Date of Patent: Aug. 23, 2016

(54) CLEANABLE PARTICLE SEPARATOR AND MOTOR VEHICLE HAVING AT LEAST ONE PARTICLE SEPARATOR

(71) Applicant: EMITEC GESELLSCHAFT FUER EMISSIONSTECHNOLOGIE MBH, Lohmar (DE)

(72) Inventors: Joachim Sittig, Siegburg (DE); Michael Voit, Leverkusen (DE); Ferdi Kurth, Mechernich (DE); Ludwig Wieres, Overath (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/897,597

(22) Filed: May 20, 2013

(65) Prior Publication Data
US 2013/0247549 A1     Sep. 26, 2013

Related U.S. Application Data

(63) Continuation of application No. PCT/EP2011/069071, filed on Oct. 31, 2011.

(30) Foreign Application Priority Data

Nov. 19, 2010   (DE) .......................... 10 2010 051 729

(51) Int. Cl.
*B01D 46/42*     (2006.01)
*F01N 3/021*     (2006.01)
(Continued)

(52) U.S. Cl.
CPC ............... *B01D 46/42* (2013.01); *F01N 3/021* (2013.01); *F01N 3/0238* (2013.01); *F01N 3/022* (2013.01);
(Continued)

(58) Field of Classification Search
CPC ....... B01D 46/42; F01N 3/022; F01N 3/0232; F01N 3/0238; F01N 2330/02; F01N 2330/12; F01N 3/021; Y02T 10/121
USPC ............................................ 60/278, 295, 311
See application file for complete search history.

(56) References Cited

U.S. PATENT DOCUMENTS 1,777,957 A     10/1930   Boemcke
4,924,668 A *   5/1990    Panten et al. ................... 60/278
(Continued)

FOREIGN PATENT DOCUMENTS

DE     3903312 A1     8/1990
DE     19910258 A1    9/2000
(Continued)

OTHER PUBLICATIONS

JP 2002221020 A Machine Translation.*
(Continued)

*Primary Examiner* — Kenneth Bomberg
*Assistant Examiner* — Brandon Lee
(74) *Attorney, Agent, or Firm* — Laurence A. Greenberg; Werner H. Stemer; Ralph E. Locher

(57) ABSTRACT

A particle separator for treating the exhaust gases of an internal combustion engine includes at least one metallic layer through which exhaust gas can flow. The metallic layer is located in a housing that includes an inlet opening, an outlet opening and a central axis. The housing is provided with at least one inspection or maintenance opening that laterally penetrates the housing and provides a passage through to the metallic layer. The particle separator can, in particular, remain operational without having to be dismantled or can autonomously remain fully open to a flow at all times. A motor vehicle having at least one particle separator is also provided.

9 Claims, 4 Drawing Sheets

(51) Int. Cl.
*F01N 3/022* (2006.01)
*F01N 3/023* (2006.01)

(52) U.S. Cl.
CPC ........... *F01N 3/0232* (2013.01); *F01N 2330/02* (2013.01); *F01N 2330/12* (2013.01); *Y02T 10/121* (2013.01)

(56) References Cited

U.S. PATENT DOCUMENTS

| | | | | |
|---|---|---|---|---|
| 5,601,068 | A | * | 2/1997 | Nozaki .................. 123/676 |
| 7,905,947 | B2 | * | 3/2011 | Leseman et al. ............ 95/273 |
| 8,082,729 | B2 | | 12/2011 | Rolle et al. |
| 2008/0127637 | A1 | * | 6/2008 | Henderson .................. 60/295 |
| 2008/0295467 | A1 | | 12/2008 | Hoffschmidt et al. |

FOREIGN PATENT DOCUMENTS

| | | | |
|---|---|---|---|
| DE | 10343046 | A1 | 5/2005 |
| DE | 102004013786 | A1 | 10/2005 |
| FR | 2920821 | A1 | 3/2009 |
| JP | S58158111 | U | 10/1983 |
| JP | H01101654 | U | 7/1989 |
| JP | H0988553 | A | 3/1997 |
| JP | 2002221020 | A * | 8/2002 |
| JP | 2010048257 | A | 3/2010 |
| JP | 2010255582 | A | 11/2010 |

OTHER PUBLICATIONS

International Search Report of PCT/EP2011/069071, dated Jan. 20, 2012.

* cited by examiner

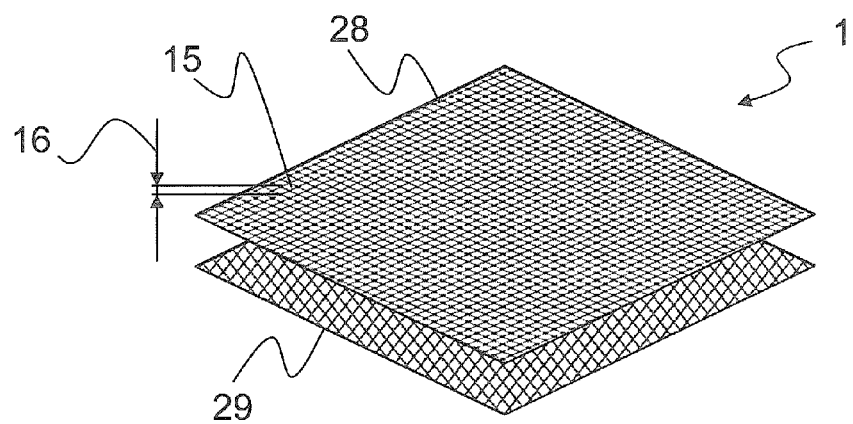
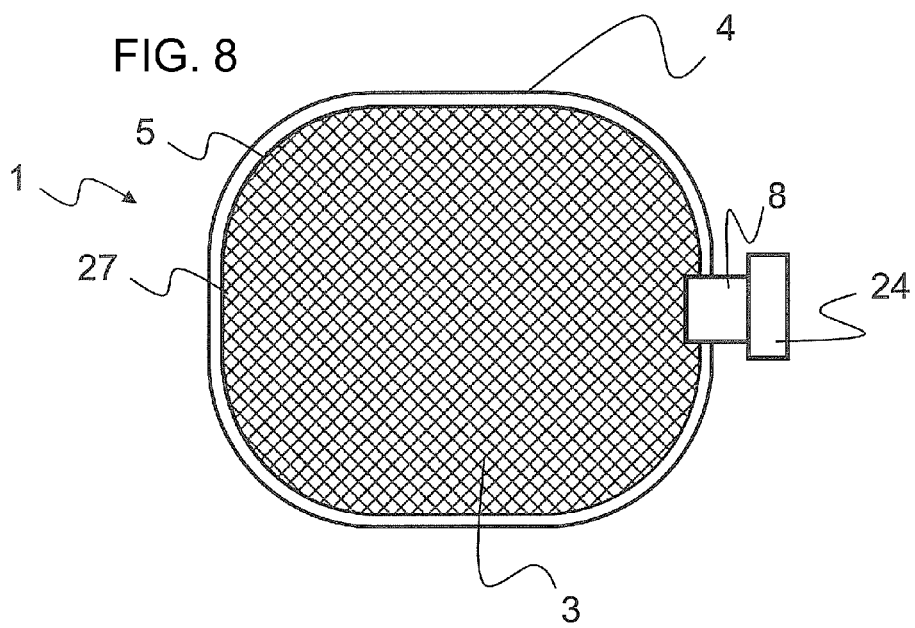

CLEANABLE PARTICLE SEPARATOR AND MOTOR VEHICLE HAVING AT LEAST ONE PARTICLE SEPARATOR

CROSS-REFERENCE TO RELATED APPLICATION

This application is a continuation, under 35 U.S.C. §120, of copending International Application No. PCT/EP2011/069071, filed Oct. 31, 2011, which designated the United States; this application also claims the priority, under 35 U.S.C. §119, of German Patent Application DE 10 2010 051 729.1, filed Nov. 19, 2010; the prior applications are herewith incorporated by reference in their entirety.

BACKGROUND OF THE INVENTION

The present invention relates to a particle separator for the treatment of exhaust gases of an internal combustion engine. The invention can be used, in particular, for mobile internal combustion engines such as are provided, for example, in motor vehicles. The invention also relates to a motor vehicle having at least one particle separator.

The exhaust gas of an internal combustion engine generally contains pollutants and solids which, specifically taking into consideration the relevant regulations for the protection of health and the environment, must be removed. With regard to the solids, it has already been proposed to filter constituents of the fuel, such as for example soot or unburned hydrocarbons, sulfur compounds, etc., out of the exhaust gas and then (catalytically and/or thermally and/or chemically) eliminate or convert them. It is known for that purpose to use filters which have, for example, a porous wall, on or in which the solids are retained.

Aside from the solids generated from the burned fuel, the exhaust gas may have entrained in it additional particles which have a different origin and which are several times larger than the solids. Internal combustion engines and the associated exhaust systems are often subject to intense vibrations during operation. That can cause particles, in particular in the form of chips, pieces of coatings and deposits and parts of exhaust-gas treatment units, to become detached and, because they are entrained by the exhaust-gas flow, damage downstream components as a result of the momentum of the impact. Furthermore, the particles can lead to increased abrasion in moving components in the exhaust system, in particular a turbocharger or turbocompressor, as a result of an increased friction action in sealing gaps. Additionally, exhaust systems are known which recirculate a part of the generated exhaust gas to the internal combustion engine again (AGR/EGR: exhaust-gas recirculation), in such a way that in that case, there is likewise the risk of the internal combustion engine being exposed to such particles and thus being damaged.

It has now been found that, with progressive operating duration, the retained particles can cause problems. It must be taken into consideration in that case that the particles are, for example, ceramic and/or metallic and are not converted in the exhaust system. Consequently, the particles accumulate in the exhaust system, for example in the vicinity of a particle separator, and/or impact repeatedly against the latter. Such an accumulation of particles may lead to a local and/or fluctuating pressure loss in the exhaust-gas flow, which may result in undesired (power-reducing) effects in the internal combustion engine and/or the exhaust system. Furthermore, in that case, the strain on the particle separator also increases, in such a way that the stability of the particle separator takes on an increasing significance.

Furthermore, in the case of planar particle separators of that type, it was also found that the connection of a screen layer and the housing was in part technically very complex and thus also expensive to implement. Furthermore, it was also observed that, in continuous operation, the connection also became partially detached again, as a result of which, to some extent, new (metallic) particles were produced which then again posed a risk to the downstream components of the exhaust system.

A further problem with the particle separators is that the accumulated (ceramic) particles cannot be converted like the solids. It is therefore sought in this case, in particular, to find a way of cleaning the particle separators.

SUMMARY OF THE INVENTION

It is accordingly an object of the invention to provide a cleanable particle separator and a motor vehicle having at least one particle separator, which overcome the hereinafore-mentioned disadvantages and at least partially solve the highlighted technical problems of the heretofore-known particle separators and motor vehicles of this general type. It is sought, in particular, to specify a particle separator for the treatment of exhaust gases, in which the particle separator, despite exhibiting a good rate of accumulation of particles, remains permanently permeable to the exhaust gas and simultaneously has a small influence on the flow and pressure conditions in an exhaust line.

With the foregoing and other objects in view there is provided, in accordance with the invention, a particle separator for the treatment of exhaust gases of an internal combustion engine, the particle separator comprising a housing with an inlet opening, an outlet opening and a central axis, at least one metallic layer through which exhaust gas can flow and which is disposed in the housing, and at least one inspection or maintenance opening which extends through a side of, or laterally through, the housing and provides a passage to the metallic layer.

In this case, a particle separator refers, in particular, to a device which retains, for example, (ceramic and/or metallic) chips, splinters, lumps, etc. which have become detached from a component of the exhaust system, for example due to the vibrations during operation and/or due to the pulsation of the exhaust-gas flow and/or due to aging. It is possible, in particular, for particles which have become detached from a ceramic or ceramically coated honeycomb body to be retained. It is also possible for less stable particles to be broken down, due to their momentum in interaction with the rigidity or inertia of the particle separator, into smaller particles which do not pose a hazard to further components disposed downstream.

The metallic layer through which the exhaust gas can flow is constructed specifically for the retention of the particles mentioned above. It is preferable in this case for only a (single) metallic layer to be used. The layer may, if appropriate, be formed with a plurality of plies (for example, a first ply for filtering out the particles and a second ply for fixing the first ply in the housing), wherein the plies are then preferably connected to one another by brazing, welding, sintering or the like. The metallic layer thus constitutes, in particular, a (single) areal structure which (completely) spans the cross-section of the housing, in such a way that a flow past the metallic layer is not possible. In this case, the metallic layer is constructed to be so robust or dimensionally stable that it can permanently withstand the conditions (in particular, the contact with the particles) at the location of use in the exhaust system.

The metallic layer may, for example, be in the form of a perforated metal sheet, in the form of a sheet-metal grid or the like. Furthermore, the metallic layer may (preferably) be in the form of a fabric which includes wires, filaments and/or chips in a regular and/or irregular configuration with respect to one another. Scrims and mats formed from wires, filaments and/or chips may also be used. The wires, filaments and/or chips may be connected to one another, for example by resistance welding, sintering and/or brazing. The metallic layer is, in particular, distinguished by its permeability to exhaust gases, so that a very low pressure loss is generated. In this case, "metallic" means, in particular, an iron-containing and/or aluminum-containing metallic alloy.

The housing is generally a sheet-metal casing which is matched to the shape of the exhaust line. The housing may be formed from tubular material with various cross-sectional shapes: circular, oval, polygonal or other required shapes. In particular, a substantially cylindrical housing which can, for example, be inserted between the adjoining parts of the exhaust line and welded thereto is used in this case.

The exhaust gas generally flows into the housing through the inlet opening, and the exhaust gas exits again through the outlet opening. The central axis of the housing generally runs through the geometric center of gravity of the inlet opening and of the outlet opening. It is possible in this case, if appropriate, for the central axis to also be curved if the housing has a bend. In the case of a cylindrical embodiment, for example, the central axis forms the central axis through the central point of the circular cross section. The cross section of the housing between the inlet opening and the outlet opening is oriented perpendicular to the central axis and may have varying area sizes and/or area shapes. It is, however, preferable for the size and shape of the cross section to be uniform along the central axis, that is to say the inlet opening, cross section and outlet opening are identical in this regard. With regard to the position of the at least one metallic layer in the housing, it is preferable for the metallic layer not to extend beyond the inlet opening or the outlet opening.

Provision is now made for there to be at least one, preferably one single or at most two, inspection opening(s) (maintenance opening(s), etc.) in the housing. The inspection opening which extends through the side of the housing allows access from the outside to the interior of the housing through the inspection opening, without the need for the particle separator to be dismounted. The inspection opening is disposed in such a way that the particle separator is accessible for maintenance and repairs. It is advantageous in this case for the inspection opening to be oriented downward (in the direction of the force of gravity). In a standstill state, therefore, the particles accumulate in the inspection opening. The passage to the metallic layer is, in particular, constructed in such a way that the internal cross section for a flow direction of the exhaust gas is reduced only slightly by the passage. It should likewise be made possible for (tools, hoses and in particular) the particles to be guided through. The passage may have any desired shape, but it is expedient for the passage to be round or circular in the manner of a tubular duct, so that in particular a large amount of freedom of movement is attained with a minimal space requirement. The inspection opening preferably has a diameter in a range of from 5 to 15 mm [millimeters].

In accordance with another advantageous feature of the particle separator of the invention, the at least one inspection opening has a separate casing which extends into an interior of the housing.

The interior of the housing is the region through which exhaust gas flows. The casing may be formed in any desired shape, and may thus be formed, for example, from metallic tubular material with any desired cross section, or from unshaped, joined, for example welded or brazed end surfaces at the side faces, to provide any desired cross section. It is advantageously possible for the separate casing of the inspection opening to be inserted through a circular bore in the housing. In particular, the casing is cohesively connected to the housing in such a way that the casing remains permanently connected to the housing in a manner secured against vibrations. "Cohesive" connections are connections in which the connecting partners are held together by atomic or molecular forces. Consequently, the separate casing is not a partial region of the housing but rather is an independent component which is connected to the housing. Furthermore, it is possible for the casing to have flow-guiding surfaces and/or suitable surfaces, coatings, etc. provided on it which allow the exhaust gas in the interior to flow around it with low pressure losses.

In accordance with a further advantageous feature of the particle separator of the invention, the at least one metallic layer has at least one depression to which the passage extends. The depression of the metallic layer is to be regarded as a depression as viewed from an approaching-flow aspect, in such a way that possible particles accumulate in the depression due to the flow pressure and/or the force of gravity. The depression may have a local form (for example in the manner of a trough), but it is preferable for the depression to have a certain extent transversely with respect to the flow direction, in particular in a cross-sectional plane perpendicular to the central axis. Through the use of the passage or the inspection opening, it is possible for at least some of the accumulated particles to be cleaned out of the depression by suction extraction and/or blowing-out in conjunction with a further inspection opening. Since the particles have already accumulated in the depression, the cleaning process can be carried out in a fast and effective manner. It may sometimes be the case that, as a result of the configuration of the passage in the downward direction, in relation to the gravitational field of the Earth, the particles automatically exit the particle separator.

In accordance with an added advantageous feature of the particle separator of the invention, the at least one metallic layer has at least one through-hole at which the passage ends. The accumulated particles in the particle filter can be easily sucked out or, with suitable configuration in the gravitational field, automatically fall out, through a through-hole in the metallic layer. The through-hole has, in particular in relation to the other openings of the metallic layer, a large cutout through which the particles can be reliably discharged.

In accordance with an additional advantageous feature of the particle separator of the invention, the passage can be closed off. In this way, in the operational state, the particle separator can, in particular, be closed off to such an extent that no exhaust gases are discharged to the outside. By contrast, during maintenance, the passage may be opened and the accumulated particle material easily removed without the need for the particle separator to be dismounted. Caps or the like may be used for closure. It is likewise possible for an (actuable) valve to be disposed on the inspection opening or on a line externally connected thereto. Access to the interior of the housing can be opened and closed by using the valve.

In accordance with yet another advantageous feature of the particle separator of the invention, the inspection opening can be connected, outside the housing, to a particle reservoir. The accumulated particles can be collected in a particle reservoir of that type without the exhaust gas escaping from an exhaust line during operation. It is nevertheless ensured at all times that the particle separator remains free from particles and always poses the least possible resistance to flow. Furthermore, a particle reservoir of that type may also be emptied without technical instruction, in such a way that damage to the metallic layer as a result of improper maintenance is eliminated. An external collecting container is used, in particular, as a particle reservoir.

In accordance with yet a further advantageous feature of the particle separator of the invention, a pressure setting device can be disposed on the at least one inspection opening. The pressure setting device is suitable for setting a positive pressure and/or a negative pressure in the passage. It is thus possible for the particles that have accumulated in the particle separator to be extracted by suction and/or blown out. For this purpose, a suitable compressed-air source and/or suction device which can, if appropriate, be switched on and/or activated according to demand, may be connected to the inspection opening. For this purpose, the inspection opening may be formed, at the outside, with a corresponding connector through which a pressure setting device contact can be applied in a fast and simple manner.

In accordance with yet an additional feature of the particle separator of the invention, the at least one depression of the metallic layer extends to the housing and the passage is disposed on a level with the at least one depression. This means, in particular, that the depression is formed not in the manner of a completely closed pouch but rather extends in the manner of a three-dimensionally shaped undulation through the housing and the extent is first delimited by opposite housing wall portions. In this way, it is possible for the metallic layer to be held in a very stable manner, wherein the passage need not extend with, for example, a casing into the housing but rather may merely be formed, as viewed from the interior of the housing, as a bore in the housing. If the passage is disposed at the level of (that is to say in a common cross-sectional plane with) the depression, it is possible for the accumulated particles to be easily removed from the particle separator by being blown through and/or sucked out. A configuration is also possible which permits self-emptying of the particle separator under the force of gravity.

A nonwoven which has wire filaments sintered with one another may be used, for example, as a metallic layer. This can preferably be described by at least one of the following features:
  diameter of the wire filaments: between 20 and 50 μm [micrometers]; in particular constructed with two different (intermixed and/or interconnected) wire filaments (for example one 20 to 25 μm; the other 38 μm to 42 μm);
  mass per unit area of the nonwoven: between 350 g/mm² and 550 g/mm² [grams per square millimeter];
  air permeability of the nonwoven: between 2300 and 3500 l/m²/s [liters per square meter and second].

Such a nonwoven may be used for retaining soot and/or other solids in the exhaust gas.

In a further advantageous embodiment of the particle separator of the invention, the at least one metallic layer is formed with openings having a width in a region of at least 0.05 mm [millimeters]. It is very particularly preferable for the metallic layer to have only openings which have at least an extent of 0.05 mm. In this case, the metallic layer preferably has a separation action or effect (only) for particles which are larger than the openings. It is very particularly preferable for the openings to have, at a maximum, a width of up to 0.25 mm, in particular in a range of from 0.1 to 0.2 mm. It is the intention for the particle separator to retain, in particular, particles which can damage or block subsequent components (situated downstream) of the exhaust system. At the same time, however, the largest possible openings should be provided, which therefore pose the least possible flow resistance. A (priority) conversion of solids from the combustion of the fuel (gasoline, diesel, etc.) is not of primary concern in this case.

With the objects of the invention in view, there is concomitantly provided a motor vehicle, comprising at least one internal combustion engine, an exhaust system formed with an exhaust-gas recirculation line, and a particle separator according to the invention which is disposed in the exhaust-gas recirculation line.

Moving parts are provided in an internal combustion engine and in the exhaust system. In particular, the cylinder and piston of the internal combustion engine and the compressor blades of a turbocompressor are reliant on their effecting a good seal despite high thermal loading. Sharp-edged ceramic parts can specifically cause severe damage to turbocompressor blades and piston sealing rings. It is now proposed herein, in particular, that the particle separator according to the invention be disposed downstream of a ceramic honeycomb body and/or a ceramically coated honeycomb body, in particular in (that is to say including "directly at") the exhaust-gas recirculation line upstream of a turbocompressor. Due to the particle separator, the adverse effect of the increase in flow resistance is practically permanently negligible. Furthermore, the particle separator can, due to its adaptable structural extent and flexibility, be used in a very flexible manner, in particular in regions of the exhaust line which have heretofore remained unutilized for structural reasons.

Other features which are considered as characteristic for the invention are set forth in the appended claims, noting that the features specified individually in the dependent claims may be combined with one another in any desired technologically expedient manner and form further embodiments of the invention.

Although the invention is illustrated and described herein as embodied in a cleanable particle separator and a motor vehicle having at least one particle separator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

FIG. 7 is an exploded perspective view of a metallic layer with two plies; and

FIG. 8 is a plan view of a particle separator with an inspection opening and a cover.

DETAILED DESCRIPTION OF THE INVENTION

Figure 1:
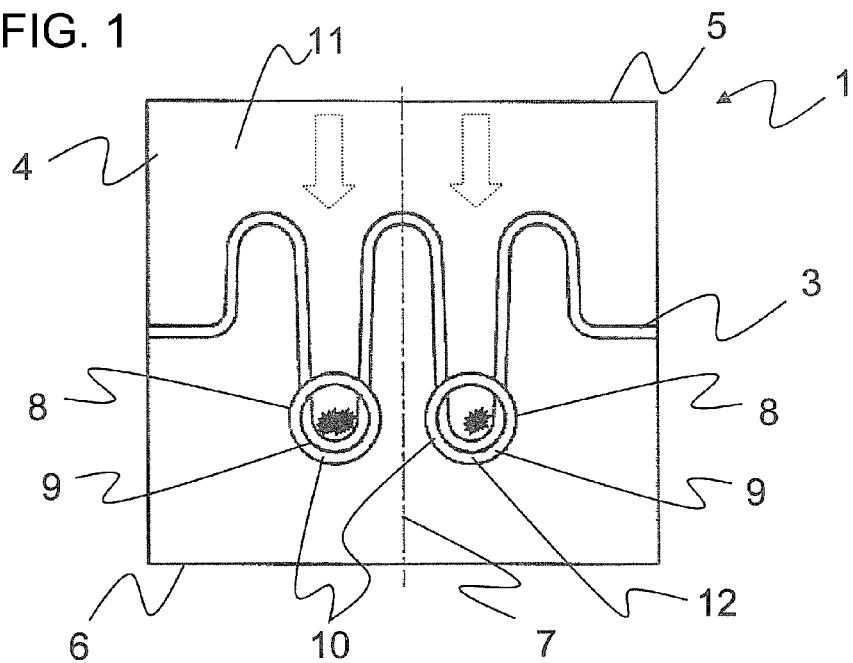
FIG. 1 is a diagrammatic, side-elevational view of a particle separator with two inspection openings.

Referring now to the figures of the drawings in detail and first, particularly, to FIG. 1 thereof, there is seen a particle separator 1 with a metallic layer 3 and two depressions 12 (undulations or corrugations which span the cross section) each having a respective inspection or maintenance opening 8 with a respective passage 9 to an interior 11 of a housing 4 of the particle separator 1. Each inspection opening 8 is provided with a casing 10. An inlet opening 5 and an outlet opening 6 of the housing 4 define a central axis 7, with respect to which the metallic layer 3 is oriented substantially perpendicularly.

Figure 2:
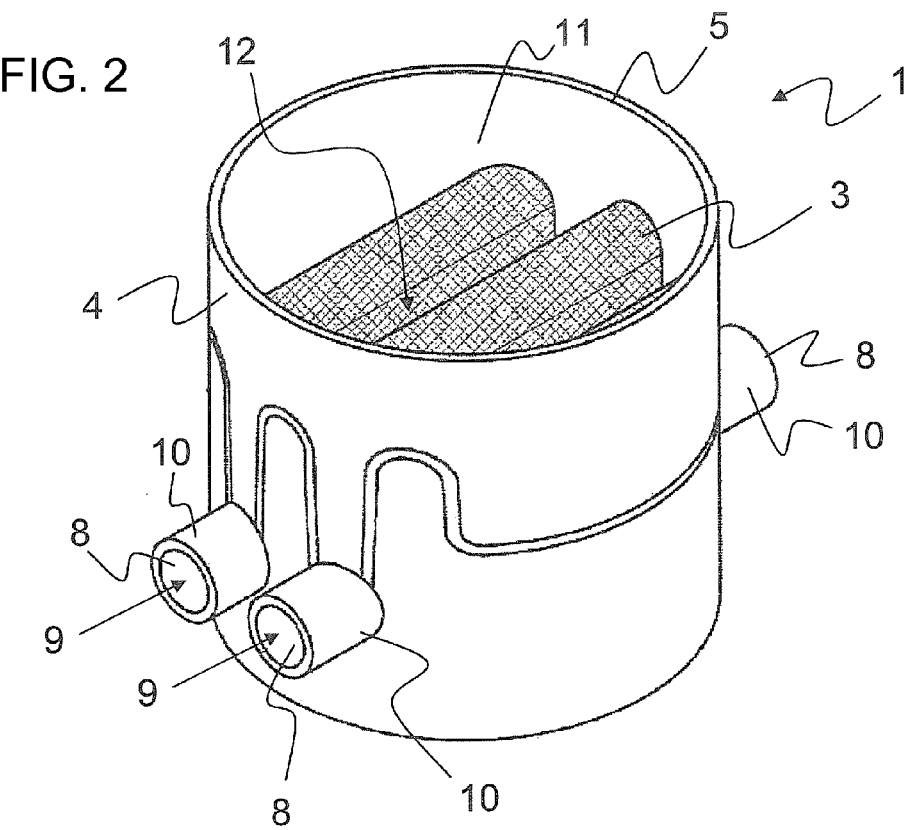
FIG. 2 is a perspective view of a particle separator with four inspection openings.

FIG. 2 shows a similar particle separator 1 with a metallic layer 3 having an undulating form or shape in the housing 4, as viewed from the inlet opening 5. It can be seen in this view that the inspection openings 8 are disposed in the depressions 12. In this case, the metallic layer 3 or the depression 12 extends to the housing 4 and the passage 9 of the inspection opening 8 is disposed on a level with (in the same cross-sectional plane perpendicular to the central axis 7 as) the depression 12. In this case, too, the inspection openings 8 are each formed with a casing 10 which forms the passage and which projects into the interior 11 of the housing 4. It can likewise be seen in the illustration that the metallic layer 3 is positioned between two housing parts of the housing and is connected thereto by using a welded connection. Due to the complex shape of the metallic layer 3, there is also a resulting complex profile of the welded connection in the circumferential direction with respect to the housing 4. In any case, a complete and sealed connection of the metallic layer 3 in the interior 11 of the housing 4 is realized in this way.

Figure 3:
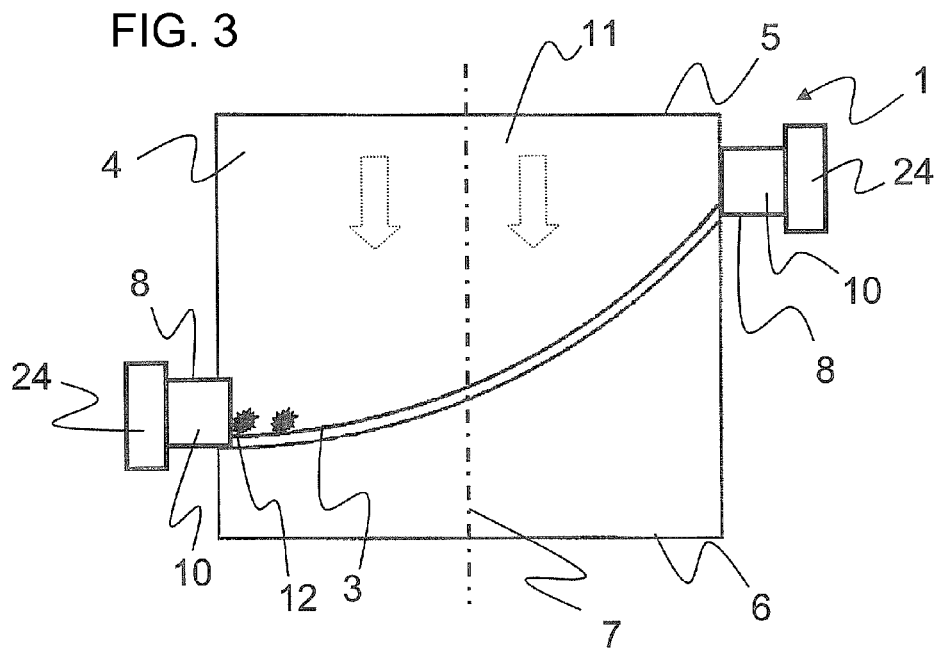
FIG. 3 is a side-elevational view of a particle separator with two inspection openings with a cover.

FIG. 3 shows a particle separator 1 in a side view, wherein again the inlet opening 5 and the outlet opening 6 define the central axis 7 of the housing 4. In this embodiment, the metallic layer 3 forms a depression 12, on the left-hand side, at which an inspection opening 8 is provided. A further inspection opening 8 is also provided on the right-hand side. In such a configuration, the left-hand inspection opening 8 may be used, for example, for suction extraction or blowing-out of accumulated particles in the depression 12. The right-hand inspection opening 8 may likewise be used for suction extraction or blowing-out. It is also possible, during an inspection of the particle separator 1, for an (air) flow through the left-hand inspection opening 8 to the right-hand inspection opening 8 or vice versa to be used to entrain the accumulated particles. It is the case in this embodiment, too, that the inspection openings 8 are formed with a separate casing 10. During operation, the inspection openings 8 are each provided with a cover 24, so that the inspection openings 8 are closed off and no exhaust gas can escape from the particle separator 1.

Figure 4:
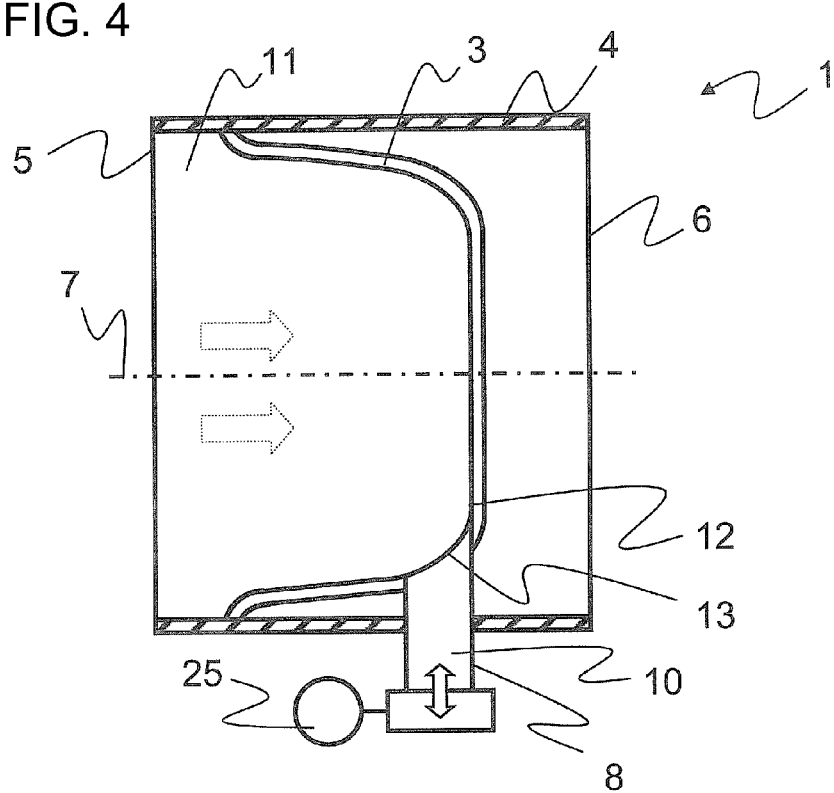
FIG. 4 is a longitudinal-sectional view of a particle separator with a pressure setting device.

FIG. 4 shows a particle separator 1 in a configuration which is turned on its side, in such a way that the inspection opening 8 extends from the outside into the housing 4 to a depression 12 of the metallic layer 3 and accumulated particles can escape autonomously through a through-hole 13 in the metallic layer 3. Furthermore, a pressure setting device 25, with which various tasks can be performed, is provided on the casing 10 of the inspection opening 8. Firstly, the exhaust gas flowing through the inlet opening 5 along the central axis 7 in the direction of the outlet opening 6 cannot escape in the normal situation, but can, in the case of a laden particle separator 1, prevent an undesired excess pressure in the exhaust line by effecting an excess-pressure opening of the pressure setting device 25. Furthermore, it is possible by using the pressure setting device 25 for a compressed-air line, for example for the cleaning of the particle separator 1 during maintenance, to be connected without additional pressure setting devices, and without the possibility of the metallic layer 3 being damaged by excessively high pressure.

Figure 5:
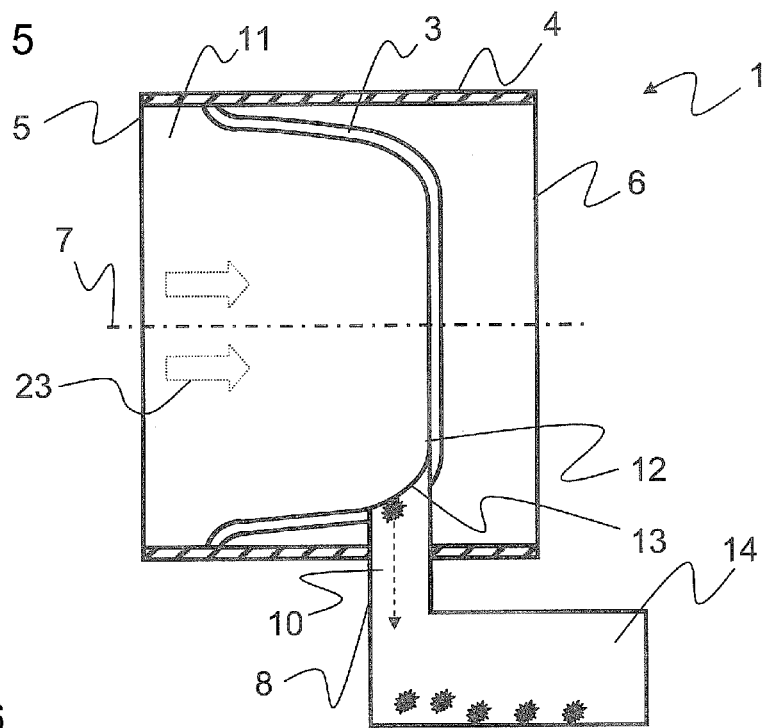
FIG. 5 is a longitudinal-sectional view of a particle separator with a particle reservoir.

FIG. 5 also shows a particle separator 1 which is disposed transversely with respect to the gravitational field, in such a way that the exhaust gas passes through the inlet opening 5 along the central axis 7 and through the metallic layer 3 in the direction of the outlet opening 6. The inspection opening 8, which projects into the interior 11 of the housing 4 at the depression 12, discharges particles, which are retained by the metallic layer 3 in the depression 12, through the through-hole 13 and through the casing 10 into a particle reservoir 14. It is ensured in this way that the particle separator 1 or the metallic layer 3 always remains fully permeable to the exhaust gas flowing in through the inlet opening 5. At the same time, however, it is also not possible for the exhaust gas to escape from the particle separator 1 into the environment.

Figure 6:
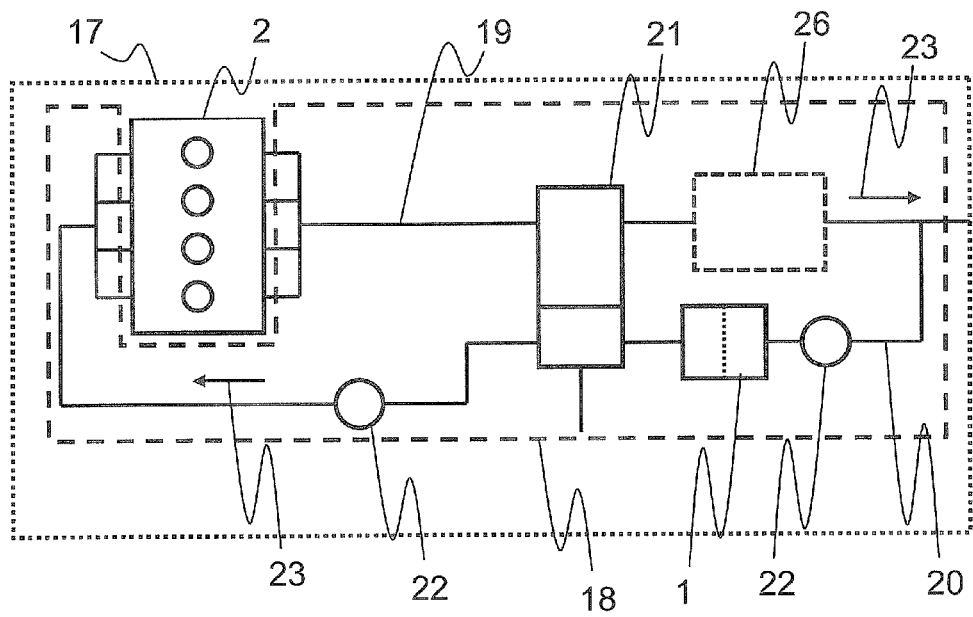
FIG. 6 is a block diagram of a motor vehicle having an exhaust system and a particle separator.

FIG. 6 shows a motor vehicle 17 which has an internal combustion engine 2, a particle separator 1, a turbocharger 21 and optionally an exhaust-gas purification unit 26. An exhaust system 18 is composed of an exhaust-gas line 19 and an exhaust-gas recirculation line 20. The displacement of the internal combustion engine 2 is supplied, on the left-hand side in the illustration, with supercharged exhaust gas, and on the other side exhaust gas flows out again in a flow direction 23. A turbocompressor of the turbocharger 21 is protected against any relatively large particles in the exhaust system 18 by the particle separator 1 in the exhaust-gas recirculation line 20. The particles may originate, for example, from a (partially) ceramic exhaust-gas purification unit 26 through which the exhaust gas has flowed through previously. The particle separator 1 thus protects all subsequent components (disposed downstream) against relatively large particles from the internal combustion engine 2 and portions of the exhaust line 19 situated upstream of the particle separator 1. Such components are, in particular, the turbocharger 21 and/or other exhaust-gas purification units and/or the coolers 22 (or heat exchangers), in particular in the exhaust-gas recirculation line 20. The internal combustion engine 2 and the displacements thereof are thus also protected against damage by relatively large particles. FIG. 6 shows an arbitrary technically expedient configuration of the particle separator 1 and does not constitute any limitation with regard to the exact configuration of the particle separator 1.

FIG. 7 shows a multi-ply version of a metallic layer 3, wherein a first ply 28 and a second ply 29 are disposed in direct areal contact with one another (shown therein partially as an exploded illustration). The first ply 28, which is initially impinged upon by a flow, has openings 15 with a width 16 that is several times smaller than a width 16 of openings 15 in the subsequent second ply 29. Therefore, (only) the first ply performs the function of particle separation, whereas the second ply 29 serves (merely) as a (rear-side) support or partial abutment for the first ply 28. In any case, the metallic layer 3 (or in this case the first ply 28) has openings 15 with a width 16 which lies in a range of from 0.05 to 0.25 mm.

FIG. 8 shows a particle separator 1 in a plan view, in which the metallic layer 3 is, for simplicity, shown with a structure which visually does not correspond to a possible undulation.

FIG. 8 shows merely one of many possibilities for the configuration of a cross section 27 of the housing 4 or of the inlet opening 5. It is likewise possible for the inlet opening 5 and the outlet opening 6 to have shapes which differ from one another and/or from some other cross section 27 of the housing 4. In this case, too, an inspection opening 8 with a cover 24 is shown on the right-hand side.

The invention thus at least partially solves the technical problems highlighted in conjunction with the prior art. There has been proposed, in particular, a particle separator which can be kept in a functional state without being dismounted and/or automatically always remains fully permeable.

The invention claimed is:

1. A particle separator for the treatment of exhaust gases of an internal combustion engine, the particle separator comprising:
   a housing having an inlet opening, an outlet opening, a central axis and at least one inspection opening extending laterally through said housing; and
   at least one metallic layer through which exhaust gas can flow;
   said at least one metallic layer disposed in said housing and said at least one inspection opening providing a passage to said at least one metallic layer, said at least one metallic layer being a single metallic layer defining one areal structure completely spanning a cross section of said housing, said at least one metallic layer having at least one depression for accumulating particles retained by said at least one metallic layer, said at least one depression being a three-dimensionally shaped undulation of said at least one metallic layer, said undulation extending through the housing, an extent of said undulation being first delimited by opposite housing wall portions of said housing, said passage extending up to said at least one depression, said at least one depression of said at least one metallic layer extending to said housing and said passage being disposed on a level with said at least one depression, said at least one inspection opening having at least one separate casing extending into an interior of said housing up to said at least one metallic layer.

2. The particle separator according to claim 1, wherein said at least one metallic layer has at least one through-hole at which said passage ends.

3. The particle separator according to claim 1, wherein said passage is configured to be closed.

4. The particle separator according to claim 1, which further comprises a particle reservoir configured to be connected to said at least one inspection opening outside said housing.

5. The particle separator according to claim 1, which further comprises a pressure regulator configured to be disposed at said at least one inspection opening.

6. The particle separator according to claim 1, wherein said at least one metallic layer is formed only with openings having a width of at least 0.05 mm.

7. A motor vehicle, comprising:
   at least one internal combustion engine;
   an exhaust system associated with said at least one internal combustion engine and having an exhaust-gas recirculation line; and
   at least one particle separator according to claim 1 disposed in said exhaust-gas recirculation line.

8. A particle separator for the treatment of exhaust gases of an internal combustion engine, the particle separator comprising:
   a housing having an inlet opening, an outlet opening, a central axis and at least one inspection opening extending laterally through said housing; and
   a single metallic layer through which exhaust gas can flow;
   said single metallic layer disposed in said housing and said at least one inspection opening providing a passage to said single metallic layer, said single metallic layer defining one areal structure completely spanning a cross section of said housing, said single metallic layer having at least one depression for accumulating particles retained by said single metallic layer, said passage extending up to said at least one depression, said at least one depression of said single metallic layer extending to said housing and said passage being disposed on a level with said at least one depression, said at least one inspection opening having at least one separate casing extending into an interior of said housing up to said at least one metallic layer.

9. A particle separator for the treatment of exhaust gases of an internal combustion engine, the particle separator comprising:
   a housing having an inlet opening, an outlet opening, a central axis and at least one inspection opening extending laterally through said housing; and
   at least one metallic layer through which exhaust gas can flow;
   said at least one metallic layer disposed in said housing and said at least one inspection opening providing a passage to said at least one metallic layer, said at least one metallic layer being a single metallic layer defining one areal structure completely spanning a cross section of said housing, said at least one metallic layer having at least one depression for accumulating particles retained by said at least one metallic layer, said passage extending up to said at least one depression, said at least one depression of said at least one metallic layer extending to said housing and said passage being disposed on a level with said at least one depression, said at least one inspection opening having at least one separate casing extending into an interior of said housing up to said at least one metallic layer.

* * * * *